(12) United States Patent
Ookawa (10) Patent No.: US 11,065,918 B2
(45) Date of Patent: Jul. 20, 2021

(54) PNEUMATIC TIRE (71) Applicant: BRIDGESTONE CORPORATION, Tokyo (JP)

(72) Inventor: Naohiro Ookawa, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 878 days.

(21) Appl. No.: 14/902,593

(22) PCT Filed: Jun. 30, 2014

(86) PCT No.: PCT/JP2014/067456
§ 371 (c)(1),
(2) Date: Jan. 4, 2016

(87) PCT Pub. No.: WO2015/002154
PCT Pub. Date: Jan. 8, 2015

(65) Prior Publication Data
US 2016/0185159 A1 Jun. 30, 2016

(30) Foreign Application Priority Data

Jul. 2, 2013 (JP) .............................. JP2013-139300

(51) Int. Cl.
*B60C 11/12* (2006.01)
*B60C 11/13* (2006.01)
*B60C 11/03* (2006.01)

(52) U.S. Cl.
CPC ........ B60C 11/1384 (2013.01); B60C 11/125 (2013.01); B60C 11/1307 (2013.01);
(Continued)

(58) Field of Classification Search
CPC .................... B60C 11/125; B60C 11/1353; B60C 11/1384
See application file for complete search history.

(56) References Cited

U.S. PATENT DOCUMENTS 4,641,697 A * 2/1987 Takahashi ........... B60C 11/1369
152/209.21
2002/0092591 A1* 7/2002 Cortes ................. B60C 11/0309
152/209.18
(Continued)

FOREIGN PATENT DOCUMENTS

JP H01-314115 * 12/1989
JP H06-234305 A 8/1994
(Continued)

OTHER PUBLICATIONS

English machine translation of JPH01-314115. (Year: 1989).*
(Continued)

*Primary Examiner* — Robert C Dye
(74) *Attorney, Agent, or Firm* — SOLARIS Intellectual Property Group, PLLC (57) ABSTRACT

A pneumatic tire includes plural land portions that are provided at a tread and that are partitioned by plural circumferential direction grooves that extend along a tire circumferential direction. A lug groove is provided at at least one land portion among the plural land portions and crosses the land portion in a tire width direction. A fine groove is provided at a groove bottom portion of the lug groove, has a narrower groove width than the lug groove, and has a groove bottom face formed with a circular arc shaped profile when viewed in cross-section at right angles to a groove length direction. A coupling curved face joins the groove bottom face and a groove side face at a length direction end portion of the fine groove, to a groove side face of the circumferential direction grooves.

11 Claims, 5 Drawing Sheets

(52) U.S. Cl.
CPC ....... *B60C 11/1353* (2013.01); *B60C 11/0327* (2013.01); *B60C 2011/0341* (2013.01); *B60C 2011/0358* (2013.01)

(56) References Cited

U.S. PATENT DOCUMENTS

| | | | |
|---|---|---|---|
| 2005/0150582 A1* | 7/2005 | Matsumura | B29D 30/0606 |
| | | | 152/209.18 |
| 2013/0160909 A1* | 6/2013 | Atake | B60C 11/0311 |
| | | | 152/209.25 |
| 2014/0224398 A1* | 8/2014 | Okabe | B60C 11/1263 |
| | | | 152/209.23 |

FOREIGN PATENT DOCUMENTS

| | | |
|---|---|---|
| JP | 2010-58696 A | 3/2010 |
| JP | 2011-084186 A1 | 4/2011 |
| JP | 2012-51504 A | 3/2012 |
| JP | 2013-082456 A | 5/2013 |

OTHER PUBLICATIONS

English machine translation of JP2011-084186. (Year: 2011).*
Office Action issued in corresponding Japanese Patent Application No. 2013-139300 dated Sep. 24, 2014.

* cited by examiner

PNEUMATIC TIRE

TECHNICAL FIELD

The present invention relates to a pneumatic tire, and relates in particular to a pneumatic tire in which land portions partitioned by circumferential direction grooves include a lateral groove.

BACKGROUND ART

As pneumatic tires, pneumatic tires have been proposed in which a sipe or a lateral groove is provided at land portions partitioned by circumferential direction grooves, in order to improved traction performance, wear resistance, and the like (see, for example, Patent Documents 1, 2).

RELATED DOCUMENTS

Related Patent Documents

Patent Document 1: Japanese Patent Application Laid-Open (JP-A) No. 2010-58696
Patent Document 2: JP-A No. 2012-51504

SUMMARY OF INVENTION

Technical Problem

In the pneumatic tire of Patent Document 1, the depth of the sipe formed to the land portions is made smaller at a shoulder side than at a tire equatorial plane side, such that river wear (uneven wear) that is liable to occur at the shoulder side of the land portions is suppressed, and an enlarged block is provided at the bottom of the sipe, such that cracks in a groove bottom face are suppressed from occurring.

In the pneumatic tire of Patent Document 2, an end portion of the sipe formed to a polygonal shaped block of a row of center blocks is formed with a cutout that is partitioned by a curved face forming a bulge toward the outside of the polygonal block and that is smoothly contiguous to each sipe wall face, a corner portion of the block formed by the circumferential direction groove and the sipe has a circular arc shape, and cracks are suppressed from occurring at the sipe bottom by preventing a concentration of stress at the sipe bottom at a sipe end position.

The present invention provides a pneumatic tire capable of avoiding an excessive concentration of stress at a groove bottom face.

Solution to Problem

A pneumatic tire according to a first aspect includes: plural land portions that are provided at a tread and that are partitioned by plural circumferential direction grooves that extend along a tire circumferential direction; a lug groove that is provided at at least one land portion among the plural land portions and that crosses the land portion in a tire width direction; a fine groove that is provided at a groove bottom portion of the lug groove, that has a narrower groove width than the lug groove, and that has a groove bottom face formed with a circular arc shaped profile when viewed in cross-section at right angles to a groove length direction; and a coupling curved face that joins the groove bottom face and a groove side face at a length direction end portion of the fine groove, to a groove side face of the circumferential direction grooves.

In the pneumatic tire according to the first aspect, the groove bottom face of the fine groove is formed in a circular arc shape, and the groove bottom face and the groove side face at the length direction end portion of the fine groove are coupled to the groove side face of the circumferential direction grooves by the coupling curved face that is curved in a shape at which stress is less liable to concentrate. This enables an excess concentration of stress across the entire groove bottom face of the fine groove, and at the length direction end portion of the fine groove, to be avoided.

A pneumatic tire according to a second aspect is the pneumatic tire according to the first aspect, further including: a first curved face that is provided so as to couple one of mutually facing groove side faces of the lug groove to a groove side face of the circumferential direction grooves, and that extends toward a groove bottom face of the circumferential direction grooves; and a second curved face that is provided so as to couple another of the mutually facing groove side faces of the lug groove to the groove side face of the circumferential direction grooves, and that extends toward the groove bottom face of the circumferential direction grooves, wherein the coupling curved face is coupled to the first curved face and to the second curved face.

In the pneumatic tire according to the second aspect, one of the mutually facing groove side faces of the lug groove and the groove side face of the circumferential direction grooves are coupled together by the first curved face, and the first curved face extends toward the groove bottom face of the circumferential direction grooves. The other of the mutually facing groove side faces of the lug groove and the groove side face of the circumferential direction grooves are coupled together by the second curved face, and the second curved face extends toward the groove bottom of the circumferential direction grooves.

Coupling portions between the groove side faces of the lug groove and the groove side face of the circumferential direction grooves accordingly form smooth curved faces without any corner portions, thereby enabling a concentration of stress at the coupling portions between the groove side faces of the lug groove and the groove side face of the circumferential direction grooves to be suppressed.

At the groove bottom face and the groove side faces at the length direction end portion of the fine groove, the first curved face and the second curved face, which are curved in a shape at which stress is less liable to concentrate, are coupled together by the coupling curved face, which is also curved in a shape at which stress is less liable to concentrate. This enables a concentration of stress across the entire groove bottom face of the fine groove, and at the length direction end portion of the fine groove, to be further suppressed.

A pneumatic tire according to a third aspect is the pneumatic tire according to the second aspect, wherein the first curved face and the second curved face slope with respect to a normal line to a tread face.

The first curved face and the second curved face slope with respect to a normal line to the tread face, thereby enabling lateral force to be distributed along the sloped curved faces without being borne perpendicularly, and enabling strain occurring when lateral force is input to be distributed.

A pneumatic tire according to a fourth aspect is the pneumatic tire according to the second aspect or the third aspect, wherein the groove bottom face of the fine groove is positioned further toward a tire radial direction outer side than a tire radial direction inner side end of the first curved face and a tire radial direction inner side end of the second curved face.

In the pneumatic tire according to the fourth aspect, the groove bottom face of the fine groove is positioned further toward the tire radial direction outer side than the tire radial direction inner side end of the first curved face and the tire radial direction inner side end of the second curved face. Thus the first curved face and the second curved face are interposed between the groove bottom face of the fine groove and the groove bottom face of the circumferential direction grooves, enabling the influence of stress occurring in the groove bottom face of the circumferential direction force on the groove bottom face of the fine groove to be suppressed.

In a pneumatic tire according to a fifth aspect, tire radial direction inner side end portions of the first curved face and the second curved face are positioned further toward the tire radial direction outer side than a deepest portion of the groove bottom face of the circumferential direction grooves.

In the pneumatic tire according to the fifth aspect, the tire radial direction inner side end portions of the first curved face and the second curved face are positioned further toward the tire radial direction outer side than the deepest portion of the groove bottom face of the circumferential direction grooves, such that stress occurring at the deepest portion of the groove bottom face of the circumferential direction grooves are less liable to affect the first curved face and the second curved face.

A pneumatic tire according to a sixth aspect is the pneumatic tire according to any one of the second aspect to the fifth aspect, wherein the first curved face and the second curved face are coupled together further toward a tire radial direction inner side than the groove bottom face of the fine groove.

The first curved face and the second curved face are coupled together further toward the tire radial direction inner side than the groove bottom face of the fine groove, such that the first curved face and the second curved face have a profile that surrounds the length direction end portion of the fine groove, enabling a concentration of stress at the length direction end portion of the fine groove to be effectively suppressed.

A pneumatic tire according to a seventh aspect is the pneumatic tire according to any one of the second aspect to the sixth aspect, wherein the lug groove and the fine groove are formed at a second land portion disposed facing a tire width direction outer side of a center land portion that is the nearest to a tire equatorial plane among the plural land portions, and the first curved face, the second curved face, and the coupling curved face are provided at a shoulder side of the second land portion.

Stress is liable to concentrate at the length direction end portion at the shoulder side of the bottom portion of the fine groove due to lateral force input from the shoulder side. However, in the pneumatic tire according to the seventh aspect, the shoulder side end portion of the fine groove is coupled to the first curved face and the second curved face by the coupling curved face, thereby enabling cracks emanating from the shoulder side end portion of the groove bottom face of the fine groove to be effectively suppressed from occurring.

A pneumatic tire according to an eighth aspect is the pneumatic tire according to any one of the second aspect to the seventh aspect, wherein a relationship $\theta3 \leq \theta1 \leq \theta2$ is satisfied, wherein $\theta1$ is an angle of the first curved face and the second curved face with respect to a normal line to a tread face of the land portion, $\theta2$ is an angle of the groove side face of the lug groove with respect to a normal line to the tread face of the land portion, and $\theta3$ is an angle of the groove side face of the circumferential direction grooves with respect to a normal line to the tread face of the land portion.

In the pneumatic tire according to the eighth aspect, the relationship $\theta3 \leq \theta1 \leq \theta2$ between the angle $\theta1$ of the first curved face and the second curved face, and the angle $\theta2$ of the groove side face of the lug groove, and the angle $\theta3$ of the groove side face of the circumferential direction grooves are satisfied. This enables the first curved face and the second curved face to be smoothly coupled to the groove side faces of the lug groove and the groove side face of the circumferential direction grooves. This enables stress to be effectively suppressed from concentrating at the coupling portions between the groove side faces of the lug groove and the groove side face of the circumferential direction grooves.

A pneumatic tire according to a ninth aspect is the pneumatic tire according to any one of the second aspect to the eighth aspect, wherein L1 and L2 are each set within a range from 10% to 15% of L0 wherein L0 is a projection length when the entire lug groove on a land portion tread face is projected in the tire circumferential direction onto a projection plane extending along the tire width direction, L1 is a projection length when the first curved face on the land portion tread face is projected in the tire circumferential direction onto a projection plane extending along the tire width direction, and L2 is a projection length of the second curved face on the land portion tread face when projected in the tire circumferential direction onto a projection plane extending along the tire width direction.

In the pneumatic tire according to the ninth aspect, the projection length L1 of the first curved face and the projection length L2 of the second curved face are each set within a range from 10% to 15% of the projection length L0 of the entire lug groove. This enables both traction performance due to the edge effect of the lug groove, and chipping resistance at the coupling portions between the lug groove and the circumferential direction grooves to be exhibited.

When L1 and L2 are less than 10% of L0, the coupling portions between the lug groove and the circumferential direction grooves has square corners and chipping is more liable to occur.

When L1 and L2 exceed 15% of L0, the edge components in the tire width direction of the lug groove is deficient, and traction performance is reduced.

A pneumatic tire according to a tenth aspect is the pneumatic tire according to any one of the second aspect to the ninth aspect, wherein a distance measured along the tire radial direction between the groove bottom face of a shoulder side end portion of the fine groove and a tire radial direction inner side end of both the first curved face and the second curved face is set within a range from 2.5 mm to 4.5 mm.

In the pneumatic tire according to the tenth aspect, the distance measured along the tire radial direction between the groove bottom face of the shoulder side end portion of the fine groove and the tire radial direction inner side end of both the first curved face and the second curved face is set within a range from 2.5 mm to 4.5 mm. This enables stress to be suppressed from concentrating at the groove bottom face of the shoulder side end portion of the fine groove, cracks to be suppressed from occurring, and the wear lifespan of the tire to be secured.

When this distance is less than 2.5 mm, the distance from the groove bottom face at the shoulder side end portion of the fine groove to the groove wall of the circumferential direction grooves positioned at the tire radial direction inner side of the fine groove is shorter, and the tire radial direction lengths of the first curved face and the second curved face, which are interposed from the groove bottom face of the shoulder side end portion of the fine groove to the wall face of the circumferential direction grooves positioned at the tire radial direction inner side of the fine groove in order to suppress stress from concentrating, is shorter. Thus, stress cannot be sufficiently suppressed from concentrating at the groove bottom face of the shoulder side end portion of the fine groove. When this distance exceeds 4.5 mm, the groove depth of the fine groove becomes deficient at an early state due to wear of the tread, and a portion of the fine groove sometimes disappears, such that the wear lifespan of the pneumatic tire is shortened.

A pneumatic tire according to an eleventh aspect is the pneumatic tire according to any one of the first aspect to the tenth aspect, wherein the fine groove is formed shallower at a shoulder side than at a tire equatorial plane side.

In the pneumatic tire according to the eleventh aspect, the fine groove is formed shallower at the shoulder side than at the tire equatorial plane side, such that the land portion has higher rigidity at the shoulder side than at the tire equatorial plane side, enabling deformation of the shoulder side of the land portion due to lateral force input from the shoulder side to be suppressed, and uneven wear originating due to lateral force to be suppressed.

Advantageous Effects of Invention

Due to being configured as described above, the pneumatic tire according to the first aspect has an excellent advantageous effect of enabling an excessive concentration of stress across the entire groove bottom face of the fine groove, and at the length direction end portion of the fine groove, to be avoided.

Due to being configured as described above, the pneumatic tire according to the second aspect enables an excessive concentration of stress across the entire groove bottom face of the fine groove, and at the length direction end portion of the fine groove, to be further suppressed.

Due to being configured as described above, the pneumatic tire according to the third aspect enables strain occurring when lateral force is input to be distributed.

Due to being configured as described above, the pneumatic tire according to the fourth aspect enables the influence of stress occurring at the groove bottom face of the circumferential direction grooves on the groove bottom face of the fine groove to be suppressed.

Due to being configured as described above, the pneumatic tire according to the fifth aspect enables stress occurring at the deepest portion of the groove bottom face of the circumferential direction grooves to be less liable to affect the first curved face and the second curved face.

Due to being configured as described above, the pneumatic tire according to the sixth aspect enables stress to be effectively suppressed from concentrating at the length direction end portion of the fine groove.

Due to being configured as described above, the pneumatic tire according to the seventh aspect enables stress to be effectively suppressed from concentrating at the shoulder side end portion of the groove bottom face of the fine groove of the second land portion, which is most liable to be influenced by lateral force.

Due to being configured as described above, the pneumatic tire according to the eighth aspect enables stress to be effectively suppressed from concentrating at the coupling portions between the groove side faces of the circumferential direction lug groove, and the groove side face of the circumferential direction grooves.

Due to being configured as described above, the pneumatic tire according to the ninth aspect enables both traction performance, and chipping resistance of the land portions, to be exhibited.

Due to being configured as described above, the pneumatic tire according to the tenth aspect enables the wear lifespan of the tire to be secured, while suppressing cracks emanating from the groove bottom face of the shoulder side end portion of the fine groove from occurring.

Due to being configured as described above, the pneumatic tire according to the eleventh aspect enables uneven wear at the shoulder side of the land portion caused by lateral force from the shoulder side to be suppressed.

DESCRIPTION OF EMBODIMENTS

Explanation follows regarding an exemplary embodiment of a pneumatic tire of the present invention, with reference to the drawings.

Figure 1:
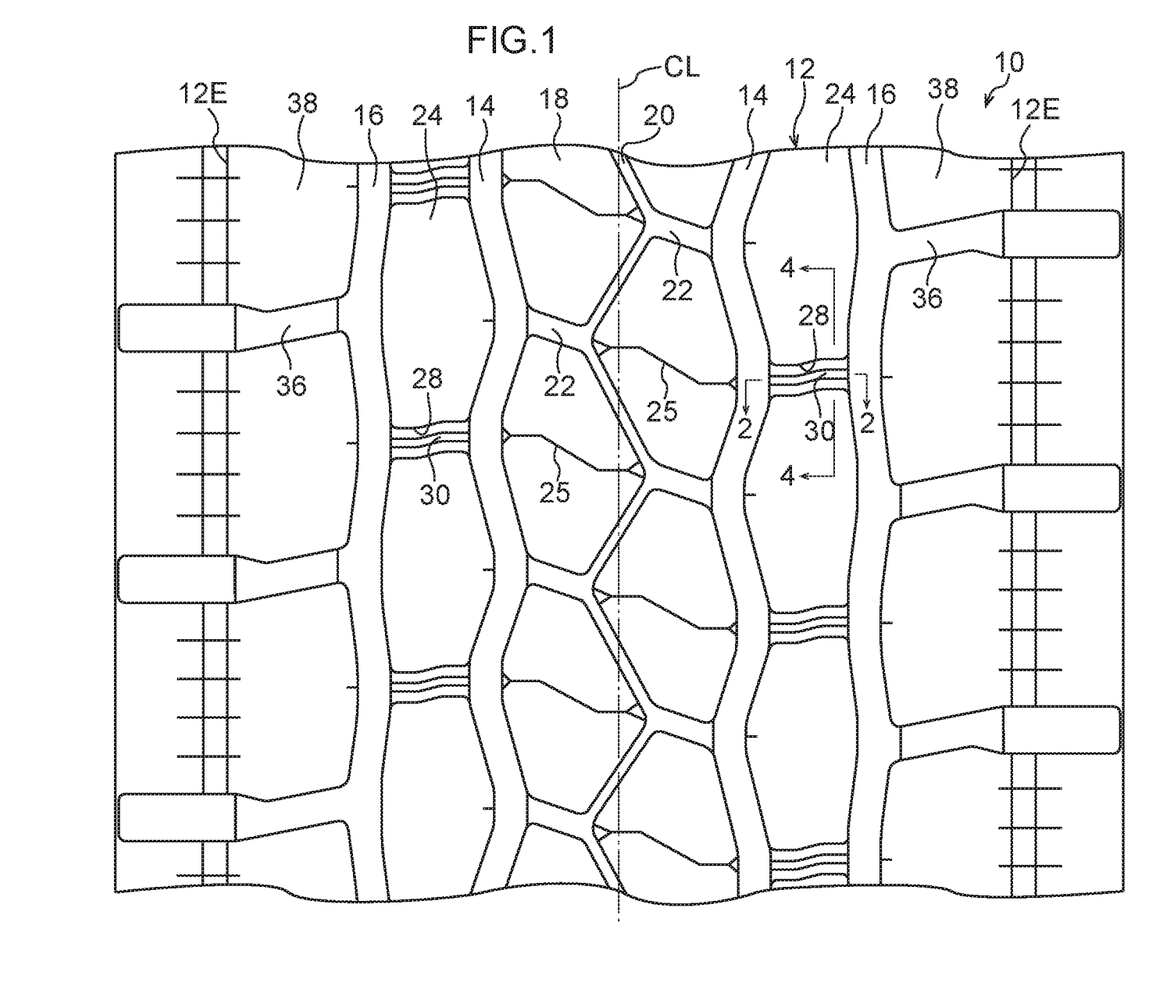
FIG. 1 is an opened out view of a tread of a pneumatic tire according to an exemplary embodiment of the present invention.

As illustrated in FIG. 1, a tread 12 of a pneumatic tire 10 of the present exemplary embodiment is formed with center side circumferential direction main grooves 14 each extending in a zigzag shape around the tire circumferential direction on either side of a tire equatorial plane CL, and formed with second circumferential direction main grooves 16 each extending in a zigzag shape around the tire circumferential direction at the tire width direction outer sides of the center side circumferential direction main grooves 14.

Figure 2A:
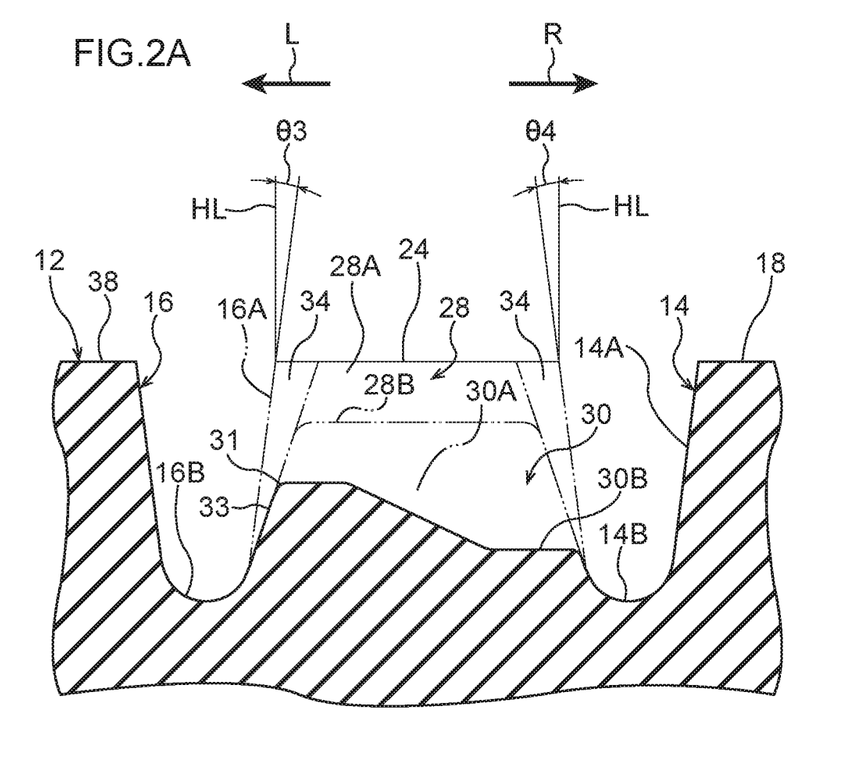
FIG. 2A is a cross-section in the vicinity of a second land portion, sectioned along the tire axial direction (a cross-section along line 2-2 in FIG. 1).

As illustrated in FIG. 2A, when each second circumferential direction main groove 16 is viewed in cross-section orthogonal to the groove length direction, a groove side face 16A of the second circumferential direction main groove 16 slopes at a fixed angle θ3 with respect to a normal line HL to a tread face of the tread 12. A groove bottom face 16B of the second circumferential direction main groove 16 is formed in a substantially semicircular shape, and the groove side face 16A and the groove bottom face 16B are smoothly coupled together.

A groove side face 14A of each center side circumferential direction main groove 14 slopes at a fixed angle θ4 with respect to a normal line HL. A groove bottom face 14B of the center side circumferential direction main groove 14 is formed in a substantially semicircular shape, and the groove side face 14A and the groove bottom face 14B are smoothly coupled together.

As illustrated in FIG. 1, a center land portion 18 partitions between one center side circumferential direction main groove 14 and the other center side circumferential direction main groove 14. A circumferential direction sub groove 20, which has a narrower groove width and a shallower groove depth than the center side circumferential direction main grooves 14, is formed extending in a zigzag shape around the tire circumferential direction at the width direction center of the center land portion 18.

The center land portion 18 is formed with center lug grooves 22 that each couple an apex portion of the zigzag shape of the center side circumferential direction main groove 14 to an apex portion of the zigzag shape of the circumferential direction sub groove 20. The center lug grooves 22 are formed with a narrower groove width and a shallower groove depth than the center side circumferential direction main grooves 14. The center land portion 18 is also formed with sipes 25 that each couple the circumferential direction sub groove 20 to the center side circumferential direction main groove 14 between each center lug groove 22 and center lug groove 22. The sipes 25 have a groove width in which the groove width becomes zero when the center land portion 18 has made ground contact, and are set with a groove depth that is shallower than the groove depth of the center lug grooves 22.

Second land portions 24 are partitioned between the center side circumferential direction main grooves 14 and the respective second circumferential direction main grooves 16. The second land portions 24 are formed with plural shallow lug groove portions 28 that each couple an apex portion of the zigzag shape of the center side circumferential direction main groove 14 to an apex portion of the zigzag shape of the second circumferential direction main groove 16, and cross a narrowest width portion of the second land portion 24 along the tire width direction. Intervals around the tire circumferential direction between each shallow lug groove portion 28 and shallow lug groove portion 28 are set longer than the widest width of the second land portion 24, in order to secure rigidity around the circumferential direction.

Figure 3:
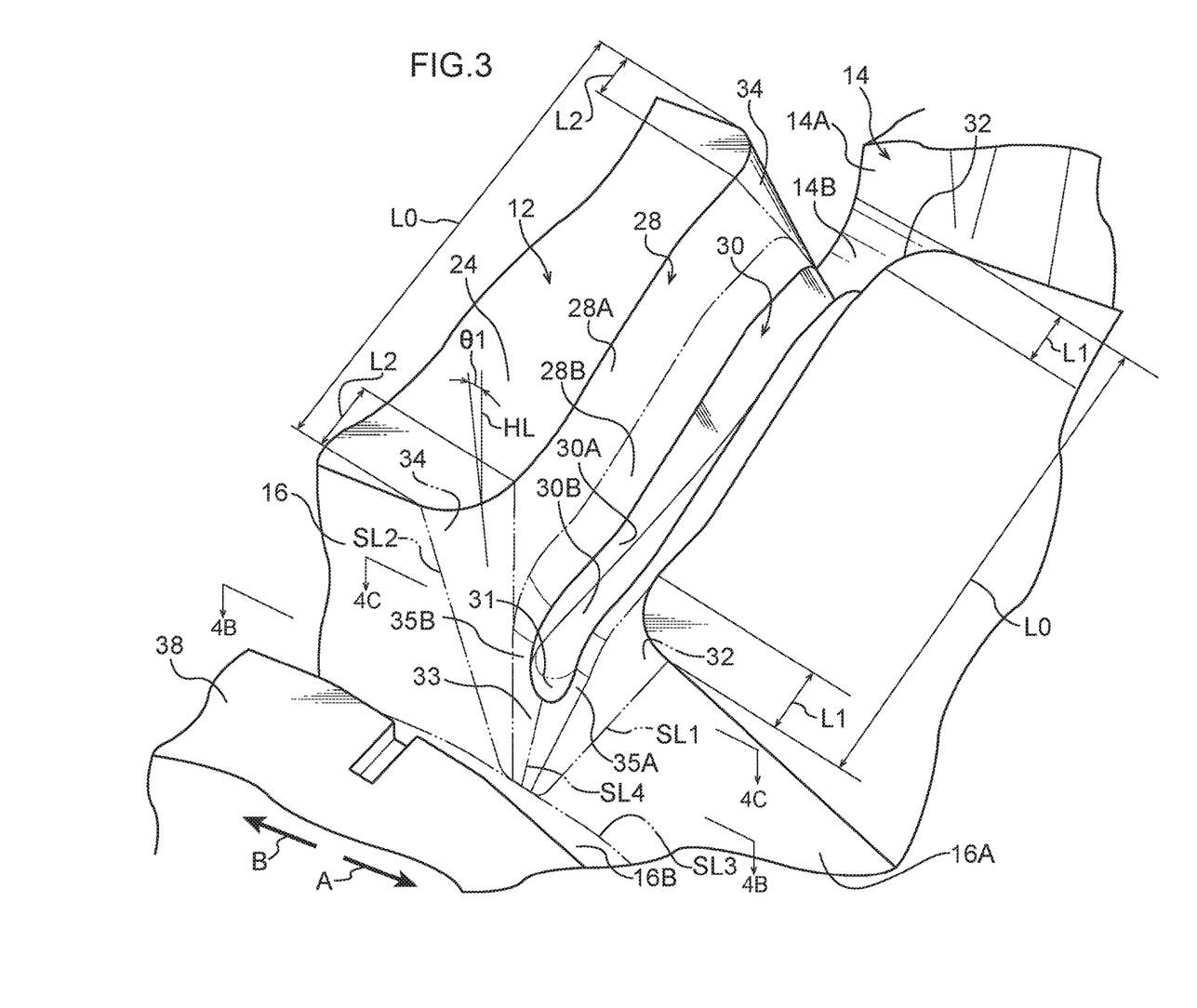
FIG. 3 is a perspective view of a second land portion viewed from a second circumferential direction groove side.

As illustrated in FIG. 2A and FIG. 3, the shallow lug groove portions 28 are formed with a shallower groove depth than the center side circumferential direction main grooves 14 and the second circumferential direction main grooves 16, and a fine groove 30 that has a narrower groove width than the shallow lug groove portion 28 is formed to a groove bottom face 28B of each shallow lug groove portion 28.

Figure 4A:
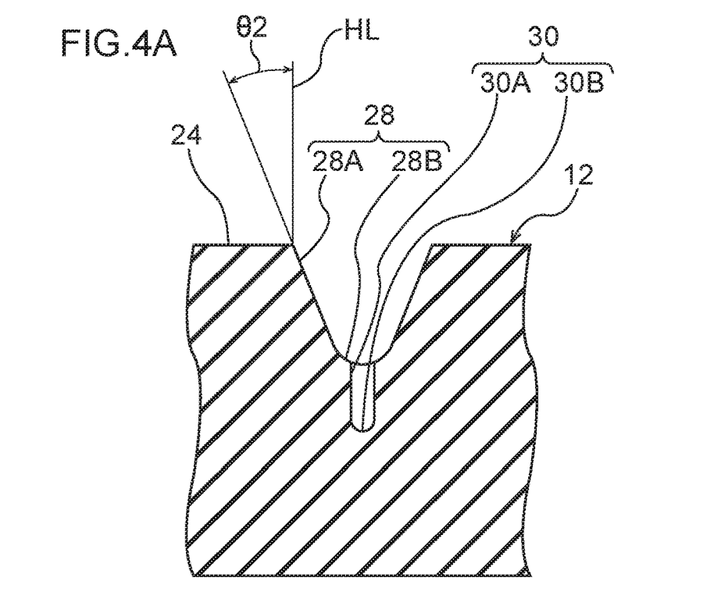
FIG. 4A is a cross-section of a second land portion, sectioned along the tire circumferential direction (a cross-section along line 4-4 in FIG. 1).

As illustrated in FIG. 4A, when viewed in cross-section at right angles to the groove length direction, a groove side face 28A of the shallow lug groove portion 28 of the present exemplary embodiment slopes at a fixed angle θ2 with respect to a normal line HL to the tread face of the tread 12. The groove bottom face 28B of the shallow lug groove portion 28 is formed in a substantially semicircular shape, and the groove side face 28A and the groove bottom face 28B are smoothly coupled together.

As illustrated in FIG. 2A and FIG. 4A, in the present exemplary embodiment, the angle θ2 of the groove side face 28A of each shallow lug groove portion 28 is set larger than the angle θ3 of the groove side face 16A of each second circumferential direction main groove 16. Note that in the present exemplary embodiment, the angle θ2 of the groove side face 28A of the shallow lug groove portion 28 is set at 22°, and the angle θ3 of the groove side face 16A of the second circumferential direction main groove 16 is set at 7°.

As illustrated in FIG. 4A, in order to secure an edge component along the tire width direction that contributes to traction, there is no bevel formed to a corner portion formed between the groove side face 28A of the shallow lug groove portion 28 and the tread face of the tread 12 (the second land portion 24).

Figure 5:
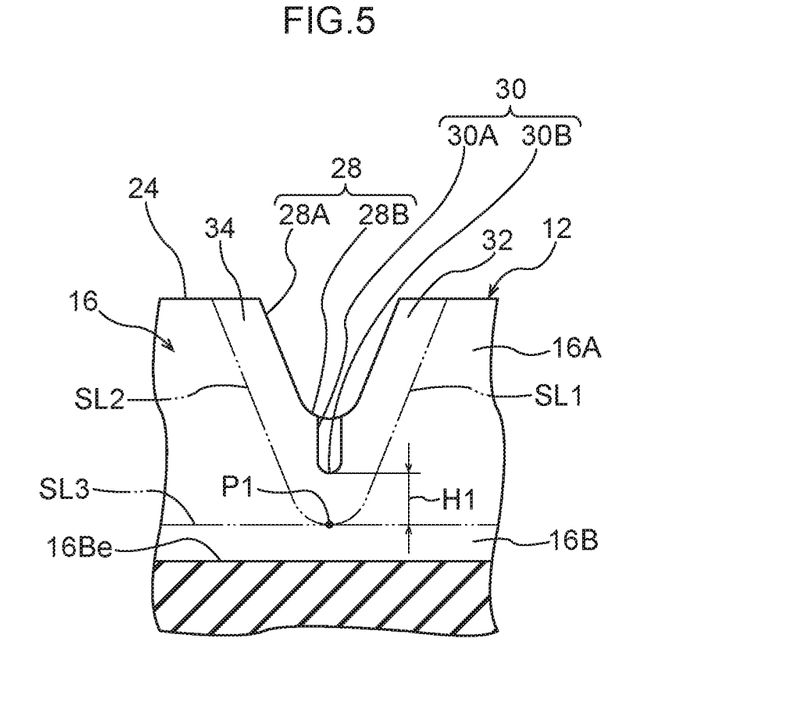
FIG. 5 is a face on view of a side wall face of a second land portion (a groove wall face of a second circumferential direction main groove), viewed from a second circumferential direction groove side.

As illustrated in FIG. 1, FIG. 3, and FIG. 5, a first curved face 32 is formed at a coupling portion between the groove side face 16A of the second circumferential direction main groove 16 and one (in the arrow A direction in FIG. 3) groove side face 28A of the shallow lug groove portion 28. The groove side face 16A of the second circumferential direction main groove 16 and the one groove side face 28A of the shallow lug groove portion 28 are smoothly linked together by the first curved face 32.

A second curved face 34 is formed at a coupling portion between the groove side face 16A of the second circumferential direction main groove 16 and the other (in the arrow B direction in FIG. 3) groove side face 28A of the shallow lug groove portion 28. The groove side face 16A of the second circumferential direction main groove 16 and the other groove side face 28A of the shallow lug groove portion 28 are smoothly linked together by the second curved face 34. Note that in FIG. 3 and FIG. 5, the reference numeral SL1 indicates a boundary between the first curved face 32 and the groove side face 16A of the second circumferential direction main groove 16, the reference numeral SL2 indicates a boundary between the second curved face 34 and the groove side face 16A of the second circumferential direction main groove 16, and the reference numeral SL3 indicates a boundary between the groove side face 16A and the groove bottom face 16B of the second circumferential direction main groove 16. If a boundary between the first curved face 32 and the second curved face 34 were illustrated, this would be a location illustrated by a double-dotted dashed line indicated by the reference numeral SL4 (which, in reality, is not visible as a line).

Note that, as illustrated in FIG. 3, the first curved face 32 and the second curved face 34 slope at an angle θ1 with respect to a normal line HL to the tread face of the tread 12, and the angle θ1 gradually changes between the angle θ2 of the groove side face 28A of the shallow lug groove portion 28 and the angle θ3 of the groove side face 16A of the second circumferential direction main groove 16.

As illustrated in FIG. 5, the first curved face 32 and the second curved face 34 extend further toward the tire radial direction inner side than the groove bottom face 28B of the shallow lug groove portion 28, and are smoothly coupled together further toward the tire radial direction inner side than a groove bottom face 30B of the fine groove 30.

A tire radial direction inner side end portion P1 of a coupling portion between the first curved face 32 and the second curved face 34 is positioned further toward the tire radial direction outer side than a deepest portion 16Be of the groove bottom face 16B of the second circumferential direction main groove 16.

Note that it is preferable that a distance H1 measured along the tire radial direction between the groove bottom face 30B at a shoulder side end portion of the fine groove 30, and the tire radial direction inner side end portion P1 of the coupling portion between the first curved face 32 and the second curved face 34, is set within a range from 2.5 mm to 4.5 mm.

Note that, as illustrated in FIG. 3, a first curved face 32 is also formed to a coupling portion between the groove side face 14A of each center side circumferential direction main groove 14 and the one groove side face 28A of each shallow lug groove portion 28, and the groove side face 14A of the center side circumferential direction main groove 14 and the one groove side face 28A of the shallow lug groove portion 28 are smoothly linked together by the first curved face 32. Moreover, a second curved face 34 is also formed to a coupling portion between the groove side face 14A of each center side circumferential direction main groove 14 and the other groove side face 28A of each shallow lug groove portion 28, and the groove side face 14A of the center side circumferential direction main groove 14 and the other groove side face 28A of the shallow lug groove portion 28 are smoothly linked together by the second curved face 34.

Note that, as illustrated in FIG. 3, it is preferable that L1 and L2 are each set within a range from 10% to 15% of L0, where L0 is a projection length when the entire shallow lug groove portion 28 on the tread face of the second land portion 24 is projected in the tire circumferential direction onto a projection plane extending along the tire width direction, L1 is a projection length when the first curved face 32 on the tread face of the second land portion 24 is projected in the tire circumferential direction onto a projection plane extending along the tire width direction, and L2 is a projection length when the second curved face 34 is projected in the tire circumferential direction onto a projection plane extending along the tire width direction. This is in order to control chipping of the coupling portions between the shallow lug groove portion 28 and the center side circumferential direction main groove 14 and chipping of the coupling portions between the shallow lug groove portion 28 and the second circumferential direction main groove 16, while securing edge components that contribute to driving force and braking force.

As illustrated in FIG. 4A, each fine groove 30 is formed at a width direction center portion of the groove bottom face 28B of the shallow lug groove portion 28. The groove width of the fine groove 30 is set such that one groove side face 30A and the other groove side face 30A that face each other contact each other when the second land portion 24 has made ground contact. In the present exemplary embodiment, the groove width of the fine groove 30 is set at 2 mm. Since the one groove side face 30A and the other groove side face 30A that face each other contact each other when the second land portion 24 has made ground contact in this manner, the second land portion 24 that has contacted the road surface is in a continuous state along the tire circumferential direction, and sufficient rigidity of the land portion is secured.

As illustrated in FIG. 2A, the fine groove 30 of the present exemplary embodiment is formed shallower at the shoulder side (the arrow L direction side) than at the tire equatorial plane CL side (the arrow R direction side in FIG. 2A), such that the second land portion 24 has higher rigidity at the shoulder side than at the tire equatorial plane CL side, and is suppressed from deforming thereat. Note that the groove depth of the fine groove 30 is smoothly changed on progression from the tire equatorial plane side toward the shoulder side, in order to avoid a concentration of stress at the groove bottom face 30B.

As illustrated in FIG. 4A, a cross-section profile of the groove bottom face 30B of the fine groove 30 is formed in a semicircular shape in order to avoid a concentration of stress. In the present exemplary embodiment, the groove width of the fine groove 30 is set at 2 mm, and the radius of curvature of the groove bottom face 30B is set at 1 mm.

As illustrated in FIG. 3 and FIG. 5, length direction end portions of the fine groove 30 are smoothly coupled to the first curved faces 32 and the second curved faces 34.

Figure 2B:
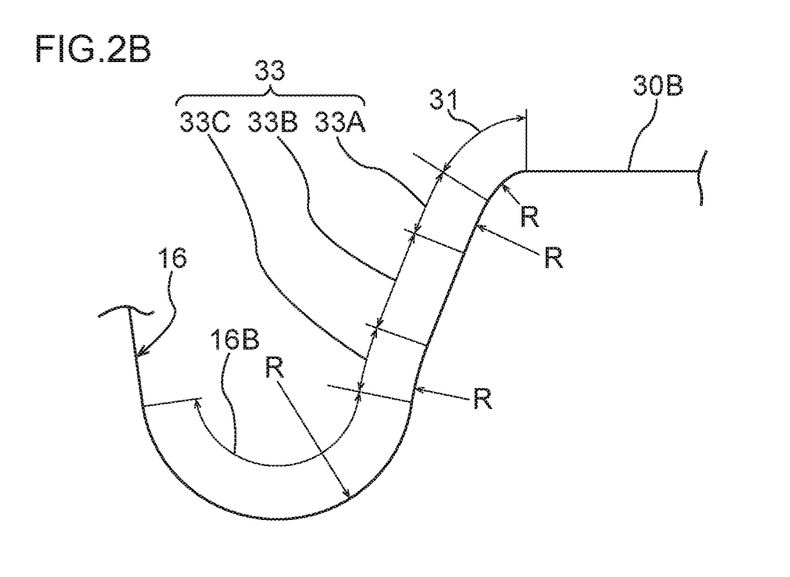
FIG. 2B is an enlarged cross-section of a portion at a second circumferential direction groove side of the second land portion illustrated in FIG. 2A.

As illustrated in FIG. 2A, the groove bottom face 30B of the fine groove 30 is smoothly coupled to the groove bottom face 16B of the second circumferential direction main groove 16 by a first circular arc portion 31 and a sloped portion 33, which each have a center of curvature inside the land portion. As illustrated in FIG. 2B, the sloped portion 33 is configured including a circular arc portion 33A (that has a larger radius of curvature than the first circular arc portion 31) that is smoothly coupled to the first circular arc portion 31, a straight line portion 33B that is smoothly coupled to the circular arc portion 33A, and a circular arc portion 33C that is smoothly coupled to the straight line portion 33B and is also smoothly coupled to the groove bottom face 16B of the second circumferential direction main groove 16. Viewed overall, the sloped portion 33 has a shape that smoothly bulges toward the second circumferential direction main groove 16.

As illustrated in FIG. 3 and FIG. 4A, the sloped portion 33 is configured by parts of a tire radial direction inner side portion of the first curved face 32, and a tire radial direction inner side portion of the second curved face 34. The first curved face 32 and the second curved face 34 each have a different shape at the tread face side and at the circumferential direction groove bottom face side. At the tread face side, the coupling portion between the groove side face 16A of the second circumferential direction main groove 16 and the one (the arrow A direction) groove side face 28A of the shallow lug groove portion 28 has a rounded beveled shape.

Figure 4B:
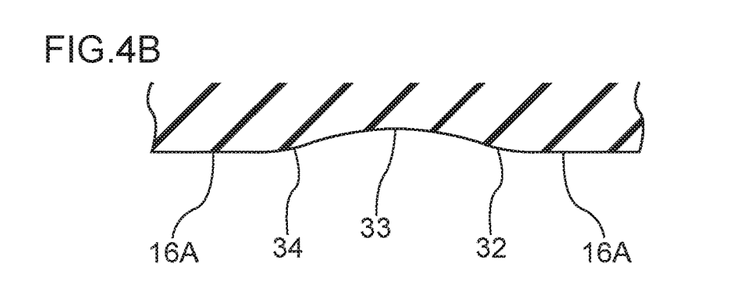
FIG. 4B is a cross-section of a portion further toward the tire radial direction lower side than a fine groove of the second land portion, sectioned parallel to a tread face (a cross-section along line 4B-4B in FIG. 3).

In contrast thereto, as illustrated in FIG. 4B, the curvatures of the first curved face 32 and the second curved face 34 are changed and are smoothly coupled together further toward the tire radial direction inner side than the fine groove 30.

The cross-section profile of the sloped portion 33 is not limited to that illustrated in FIG. 2, and a configuration in which the first circular arc portion 31 and the groove bottom face 16B of the second circumferential direction main groove 16 are smoothly coupled together enabling a concentration of stress to be suppressed is sufficient, such that a configuration may be applied in which only a curved line is formed, without a straight line portion.

Figure 4C:
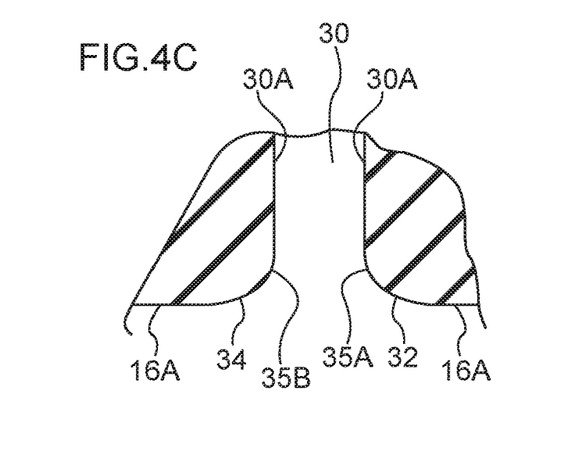
FIG. 4C is a cross-section at a depth direction intermediate position of a fine groove of a second land portion, sectioned parallel to a tread face (a cross-section along line 4C-4C in FIG. 3).

As illustrated in FIG. 3 and FIG. 4C, a length direction end portion of the one groove side face 30A of the fine groove 30 is smoothly connected to the first curved face 32 by a curved face 35A, and a length direction end portion of the other groove side face 30A of the fine groove 30 is smoothly coupled to the second curved face 34 by a curved face 35B. Namely, both the groove side face 30A and the groove bottom face 30B of the fine groove 30 are smoothly coupled to the first curved face 32 and the second curved face 34 such that stress does not concentrate thereon.

The first circular arc portion 31, the curved face 35A, and the curved face 35B described above correspond to a coupling curved face of the present invention.

As illustrated in FIG. 1, a shoulder land portion 38 that is partitioned by the second circumferential direction main groove 16, and by shoulder lug grooves 36 extending from the second circumferential direction main groove 16 toward the tire width direction outer side, is disposed at the tire width direction outer side of each second circumferential direction main groove 16. Note that in FIG. 1, the reference numerals 12E indicate tread edges (edge portions of the shoulder land portions 38).

Operation and Advantageous Effects

In the pneumatic tire 10 of the present exemplary embodiment, the first curved face 32 is formed at the coupling portion between the groove side face 16A of each second circumferential direction main groove 16 and the one groove side face 28A of each shallow lug groove portion 28, and the second curved face 34 is formed at the coupling portion between the groove side face 16A of each second circumferential direction main groove 16 and the other groove side face 28A of each shallow lug groove portion 28. Thus, at the coupling portions between the groove side faces 28A of the shallow lug groove portion 28 and the groove side face 16A of the second circumferential direction main groove 16, lateral force can be distributed along the sloped faces without being borne perpendicular to the tread face, thereby enabling strain occurring when lateral force is input to be distributed, compared to cases in which there are no slopes. Force that is not only lateral force, but also force from the circumferential direction can be distributed.

Note that in the pneumatic tire 10 of the present exemplary embodiment, a relationship between the angle θ1 of the first curved face 32 and the second curved face 34, the angle θ2 of the groove side faces 28A of the shallow lug groove portion 28, and the angle θ3 of the groove side face 16A of the second circumferential direction main groove 16 is θ3≤θ1≤θ2, such that the first curved face 32 and the second curved face 34 are smoothly coupled to the groove side faces 28A of the shallow lug groove portion 28 and the groove side face 16A of the second circumferential direction main groove 16. This enables stress to be effectively suppressed from concentrating at the coupling portions between the groove side faces 28A of the shallow lug groove portion 28 and the groove side face 16A of the second circumferential direction main groove 16.

The fine grooves 30 formed to the second land portions 24 are each formed with a shallower groove depth at the shoulder side than at the tire equatorial plane side, such that the second land portions 24 have a higher rigidity at the shoulder side than at the tire equatorial plane side. Deformation of the shoulder side of the second land portions 24 due to lateral force input from the shoulder side is thereby suppressed, enabling river wear of the second land portions 24 caused by lateral force to be suppressed.

Since the groove bottom face 30B of each fine groove 30 is formed with a circular arc shaped curved face, stress is suppressed from concentrating at the groove bottom face 30B of the fine groove 30, and cracks that emanate from the groove bottom face 30B of the fine groove 30 when lateral force or circumferential direction force has been input to the second land portions 24 are suppressed from occurring.

Since the shoulder side end portion of each fine groove 30 is smoothly coupled to the first curved face 32 and the second curved face 34, stress is suppressed from concentrating at the shoulder side end portion of the fine groove 30, and cracks that emanate from an end portion of the groove bottom face 30B at the shoulder side of the fine groove 30 when lateral force or circumferential direction force has been input to the second land portions 24 are suppressed from occurring.

The projection length L1 of each first curved face 32 and the projection length L2 of each second curved face 34 are each set within a range from 10% to 15% of the projection length L0 of the entire shallow lug groove portion 28. This enables both traction performance due to the edge effect of the shallow lug groove portion 28, and chipping resistance of the corner portions formed by the shallow lug groove portion 28 and the second circumferential direction main groove 16, to be exhibited. Note that when L1 and L2 are less than 10% of L0, chipping is more liable to occur at the corner portions formed between the shallow lug groove portion 28 and the second circumferential direction main groove 16. When L1 and L2 exceed 15% of L0, the edge components in the tire width direction of the shallow lug groove portion 28 are insufficient, and traction performance is reduced.

In the pneumatic tire 10 of the present exemplary embodiment, the distance H1 measured along the tire radial direction between the groove bottom face 30B of each fine groove 30 and the tire radial direction inner side end portion P1 of the first curved face 32 and the second curved face 34 is set within a range from 2.5 mm to 4.5 mm. This enables the wear lifespan of the pneumatic tire 10 to be secured, while suppressing stress from concentrating at length direction end portion of the groove bottom face 30B of the fine groove 30, and cracks that emanate from the length direction end portion of the groove bottom face 30B are suppressed from occurring. Note that when the distance H1 is less than 2.5 mm, concentration of stress at the length direction end portion of the groove bottom face 30B of the fine groove 30 cannot be sufficiently suppressed. When the distance H1 exceeds 4.5 mm, the fine groove 30 is separated from the tire radial direction inner side end portion P1 of the first curved face 32 and the second curved face 34 toward the tire radial direction outer side, the groove bottom face 30B is closer to the tread face of the tread 12, the groove depth of the fine groove 30 soon becomes deficient due to wear on the tread 12 (in some cases, part of the fine groove 30 disappears), and the wear lifespan of the pneumatic tire 10 is shortened.

TEST EXAMPLE 1

In order to confirm the advantageous effects of the invention, plural Comparative Example tires and Example tires were respectively manufactured, in which the distance H1 (see FIG. 5) measured along the tire radial direction between the position of the groove bottom face at the shoulder side of the fine groove of each second lug groove, and the tire radial direction inner side end of the first curved face and the second curved face was changed. A comparison of whether or not cracking occurred on the groove bottom face of the fine groove, and a comparison of the wear life, were performed.

Note that the sample tires each had a tire size of 275/80R22.5, and were set with an internal pressure of 900 kPa. Height of second land portions (groove depth of second circumferential direction main grooves): 14.0 mm
Groove width of shallow lug grooves: 8.9 mm
Groove depth of shallow lug grooves: 4.2 mm
Groove width of fine grooves: 2 mm The distance H1 was changed by fixing the position of the tire radial direction inner side end of the first curved face and the second curved face (fixed at a position of 2.0 mm in the tire radial direction from the groove bottom of the second circumferential direction main groove), and changing the groove depth at the shoulder side of the fine groove. The specifications of the Comparative Example tires and the Example tires other than the distance H1 were the same.

Presence of cracking: the sample tires were fitted to a drum test machine, set at a slip angle of 5°, applied with a load of 2,725 kg, and run at 60 km/h for 12 hours. After test running, a check was made as to whether or not cracking had occurred on the groove bottom face of each fine groove.

Wear life: the tread gauge was measured after running for 30,000 km on a wear test drum (in a state applied with load). The Comparative Example 2 was set with an index value of 100, as the position of a conventional example. Higher values indicate better performance.

TABLE 1

|  | Comparative Example 1 | Example 1 | Example 2 | Example 3 | Comparative Example 2 | Comparative Example 3 |
| --- | --- | --- | --- | --- | --- | --- |
| Distance H1 | 0.5 mm | 2.5 mm | 3.5 mm | 4.5 mm | 1.5 mm | 5.0 mm |
| Presence of cracking | Yes, at shoulder side end portion | No | No | No | No | No |
| Wear life (index) | 95 | 110 | 110 | 103 | 100 | 98 |

It can be seen from the test results that, in the Example tires 1 to 3, cracks emanating from the groove bottom faces of the fine grooves are suppressed from occurring, and the wear life is long.

TEST EXAMPLE 2

In order to confirm the advantageous effects of the invention, plural Comparative Example tires and Example tires, in which the lengths projected in the tire circumferential direction of the first curved face and the second curved face (L1, L2) were changed with respect to the length projected in the tire circumferential direction of the shallow lug groove (L0) in each second land portion, were respectively manufactured. Comparisons of traction performance and edge chipping resistance were performed.

Note that the sample tires each had a tire size of 275/80R22.5, and were set with an internal pressure of 900 kPa.

The specifications of the Comparative Example tires and the Example tires other than the first curved faces and the second curved faces were the same.

Traction performance: an unladen vehicle (actual vehicle) was run on a test course road surface, the travel time over a determined distance was measured, and an evaluation (shown in indices) was performed. Higher values indicate better performance.

Edge chipping resistance: the sample tires were fitted to a drum test machine, set at a slip angle, applied with a side force of 0.2 G, run at 60 km/h for 12 hours. The degree of chipping of the fine groove edges after running was evaluated.

TABLE 2

|  | Comparative Example 4 | Example 4 | Example 5 | Example 6 | Comparative Example 5 |
| --- | --- | --- | --- | --- | --- |
| Ratio L1, L2/L0 | 0% | 10% | 12.5% | 15% | 20% |
| Traction performance | 115 | 110 | 110 | 105 | 95 |
| Edge chipping resistance | unacceptable | acceptable | acceptable | acceptable | acceptable |

It can be seen from the test results that the Example tires 4 to 6 have superior performance with respect to both traction performance and edge chipping resistance.

Other Exemplary Embodiments

In the above exemplary embodiment, in order to suppress excessive stress from concentrating at the groove bottom face 30B, and at the groove length direction end portions of the groove bottom face 30B of each fine groove 30 of the second land portions 24, the first curved faces 32 and the second curved faces 34 are formed at the second land portion 24. Moreover, the length direction end portion of each fine groove 30 is smoothly coupled to the groove side face 16A of the second circumferential direction main groove 16 by the first circular arc portion 31, the curved face 35A, and the curved face 35B, as well as the first curved face 32 and the second curved face 34. However, the present invention is not limited thereto, and curved faces similar to the first circular arc portion 31, the curved face 35A, and the curved face 35B, as well as the first curved face 32 and the second curved face 34, may be formed to the center land portion 18 and the shoulder land portions 38, and these curved faces may be smoothly coupled in the length direction to narrow width grooves such as sipes. This would enable excessive stress to also be suppressed from concentrating at length direction end portions of groove bottom faces of the narrow width grooves in the center land portion 18 and the shoulder land portions 38.

Note that smoothly coupling the length direction end portion of each fine groove 30 to the groove side face 16A of the second circumferential direction main groove 16 by the first circular arc portion 31, the curved face 35A, and the curved face 35B without forming the first curved face 32 and the second curved face 34 also has the advantageous effect of suppressing stress from concentrating at the groove length direction end portion of the groove bottom face 30B of the fine groove 30.

Exemplary embodiments of the pneumatic tire of the present invention have been explained above, however the present invention is not limited to the above, and obviously various modifications, such as the dimension, angle, and shape of each portion, may be implemented within a range not departing from the spirit of the present invention.

The invention claimed is:

1. A pneumatic tire, comprising:
   a plurality of land portions that are provided at a tread and that are partitioned by a plurality of circumferential direction grooves that extend along a tire circumferential direction;
   a lug groove that is provided at at least one land portion among the plurality of land portions and that crosses the at least one land portion in a tire width direction;
   a fine groove that is provided at a groove bottom portion of the lug groove, that has a narrower groove width than the lug groove, and that has a groove bottom face formed with a circular arc shaped profile when viewed in cross-section at right angles to a groove length direction;
   a first curved face that is provided so as to couple one of mutually facing groove side faces of the lug groove to a groove side face of a circumferential direction groove, and that extends toward a groove bottom face of the circumferential direction groove; and
   a second curved face that is provided so as to couple another of the mutually facing groove side faces of the lug groove to the groove side face of the circumferential direction groove, and that extends toward the groove bottom face of the circumferential direction groove;
   wherein a length direction end portion of one groove side face of the fine groove is smoothly connected to the first curved face by a first coupling curved face, and a length direction end portion of the other groove side face of the fine groove is smoothly coupled to the second curved face by a second coupling curved face,
   wherein a third coupling curved face joins the groove bottom face at a length direction end portion of the fine groove, to a groove side face of the circumferential direction groove,
   wherein a first extension line configures a boundary between the first curved face and the first coupling curved face, and the first extension line extends from a boundary line between the first curved face and one groove side face of the lug groove,
   wherein a second extension line configures a boundary between the second curved face and the second coupling curved face, and the second extension line extends from a boundary line between the second curved face and the one groove side face of the lug groove,
   wherein the third coupling curved face has a first circular arc portion and a sloped portion, each of the first circular arc portion and the sloped portion having a center of curvature inside the at least one land portion, and the groove bottom face of the fine groove is smoothly coupled to the groove bottom face of the circumferential direction groove by the first circular arc portion and the sloped portion, and
   wherein the sloped portion has a shape that smoothly bulges toward the circumferential direction groove.

2. The pneumatic tire of claim 1, wherein the first curved face and the second curved face slope with respect to a normal line to a tread face.

3. The pneumatic tire of claim 1, wherein the groove bottom face of the fine groove is positioned further toward a tire radial direction outer side than a tire radial direction inner side end of the first curved face and a tire radial direction inner side end of the second curved face.

4. The pneumatic tire of claim 1, wherein tire radial direction inner side end portions of the first curved face and the second curved face are positioned further toward the tire radial direction outer side than a deepest portion of the groove bottom face of the circumferential direction groove.

5. The pneumatic tire of claim 1, wherein the first curved face and the second curved face are coupled together, by the first coupling curved face, the second coupling curved face, and third coupling curved face, further toward a tire radial direction inner side than the groove bottom face of the fine groove.

6. The pneumatic tire of claim 1, wherein:
   the lug groove and the fine groove are formed at a second land portion disposed facing a tire width direction outer side of a center land portion that is the nearest to a tire equatorial plane among the plurality of land portions; and
   the first curved face, the second curved face, the first coupling curved face, the second coupling curved face, and the third coupling curved face, are provided at a shoulder side of the second land portion.

7. The pneumatic tire of claim 1, wherein:
   a relationship $\theta 3 \leq \theta 1 \leq \theta 2$ is satisfied,
   wherein $\theta 1$ is an angle of the first curved face and the second curved face with respect to a normal line to a tread face of the at least one land portion, $\theta 2$ is an angle of the groove side faces of the lug groove with respect to a normal line to the tread face of the at least one land portion, and $\theta 3$ is an angle of the groove side face of the circumferential direction groove with respect to a normal line to the tread face of the at least one land portion.

8. The pneumatic tire of claim 1, wherein:
   L1 and L2 are each set within a range from 10% to 15% of L0,
   wherein L0 is a projection length when the entire lug groove on a land portion tread face is projected in the tire circumferential direction onto a projection plane extending along the tire width direction, L1 is a projection length when the first curved face on the land portion tread face is projected in the tire circumferential direction onto a projection plane extending along the tire width direction, and L2 is a projection length of the second curved face on the land portion tread face when projected in the tire circumferential direction onto a projection plane extending along the tire width direction.

9. The pneumatic tire of claim 1, wherein a distance measured along the tire radial direction between the groove bottom face of a shoulder side end portion of the fine groove and a tire radial direction inner side end of both the first curved face and the second curved face is set within a range from 2.5 mm to 4.5 mm.

10. The pneumatic tire of claim 1, wherein the fine groove is formed shallower at a shoulder side than at a tire equatorial plane side.

11. The pneumatic tire of claim 1, wherein the sloped portion comprises:
    a second circular arc portion that has a larger radius of curvature than the first circular arc portion and that is smoothly coupled to the first circular arc portion;
    a straight line portion that is smoothly coupled to the second circular arc portion; and
    a third circular arc portion that is smoothly coupled to the straight line portion and that is also smoothly coupled to the groove bottom face of the circumferential direction groove.

* * * * *